US00RE34108E

United States Patent [19]

Grass

[11] E Patent Number: Re. 34,108

[45] Reissued Date of Patent: Oct. 20, 1992

[54] PULL-OUT GUIDE FOR DRAWERS

[75] Inventor: Alfred Grass, Höchst, Austria

[73] Assignee: Grass America, Inc., Kernersville, N.C.

[21] Appl. No.: 729,462

[22] Filed: Jul. 12, 1991

Related U.S. Patent Documents

Reissue of:

[64] Patent No.: 4,564,248
Issued: Jan. 14, 1986
Appl. No.: 589,125
Filed: Mar. 13, 1984

[30] Foreign Application Priority Data

Mar. 25, 1983 [AT] Austria ..... 1057/83

[51] Int. Cl.[5] ..... F16C 29/12; A47B 88/00

[52] U.S. Cl. ..... 384/19; 312/333

[58] Field of Search ..... 384/18, 19; 312/330.1, 312/333, 334, 335, 338-348

[56] References Cited

U.S. PATENT DOCUMENTS

| | | | |
|---|---|---|---|
| 2,328,835 | 9/1943 | Motter | 312/341.1 X |
| 3,026,149 | 3/1962 | Ruhnke | 384/19 |
| 3,104,142 | 9/1963 | Knape et al. | 312/333 |
| 3,243,247 | 3/1966 | Knape | 312/333 |
| 3,973,814 | 8/1976 | Entrikin | 312/333 |
| 4,447,095 | 5/1984 | Fielding | 384/19 |

FOREIGN PATENT DOCUMENTS

| | | |
|---|---|---|
| 337400 | 10/1976 | Austria . |
| 355247 | 7/1979 | Austria . |

*Primary Examiner*—Thomas R. Hannon

[57] ABSTRACT

A pull-out guide for drawers consists of two 2 frame sides, U-shaped guide rails and Z-shaped pull-out rails movable therein, both the guide and pull-out rails being provided with a roller each, and the lower guide legs of the U-shaped guide rails having in their end areas run-in slopes adjoined by run-in stops each, and the front end areas of the upper pull-out rail legs, serving as rolling surfaces for the rollers, having a run-in slope each oriented in the same direction and preferably parallel to the run-in slope in the end area of the guide rail on the frame side. This improves the pull-in and staying closed behavior when drawers of little net weight and small load capacity are involved. Because the legs of both rail pairs of the pull-out guide run parallel, the front blind is approximately jointlessly flush with the frame.

2 Claims, 2 Drawing Sheets

PULL-OUT GUIDE FOR DRAWERS

Matter enclosed in heavy brackets [ ] appears in the original patent but forms no part of this reissue specification; matter printed in italics indicates the additions made by reissue.

BACKGROUND OF THE INVENTION

The invention relates to a pull-out guide for drawers or the like with two U-shaped guide rails on the frame side and Z-shaped pull-out rails movable therein, both the guide rails and the pull-out rails being provided with a roller each and the lower guide legs of the U-shaped guide rails having in their end areas run-in slopes adjoined by run-in stops.

Many kinds of pull-out guides of these systems are known. The U-shaped guide rails are fastened on both sides to the sidewalls of the furniture frame. The pull-out rails guided therein are designed to that they can support, in sliding fashion, slide-ins, boards, drawers, etc. It is also possible to design the pullout rails as frame rails, the vertical legs of such frame guide rails being widened, thereby forming at the same time the sidewalls of drawers.

It is common to all these pull-out guides that stops limit the pull-out motion and slide-in motion of both the guide and pull-out rails and that the pull-out, such as a drawer, is automatically pulled in during its slide-in motion shortly before reaching the closed position. This is called automatic drawer pull-in.

This automatic pull-in is obtained because the lower, horizontal leg of the guide rail supporting the pull-out rail is bent obliquely backwards and downwards so that the pull-out rail roller rolls automatically into the lower area of this bevel as a result of the weight of the drawer, coming to rest against the bent-up end piece of the horizontal guide leg adjacent to the bevel. The limitation of the slide-in motion is called run-in stop.

One disadvantage of the given lowering of the drawer in its rear area is that the pull-out rail is no longer parallel to the guide rail in closed position. The drawer blind, fastened to the pull-out rail perpendicular to the pull-out plane, is also inclined from the vertical plane by the angle of the offset pull-out rail and is no longer parallel to the front face of the furniture frame. It requires costly means for blind adjustment to correct this ugly looking joint.

Another disadvantage brought about by lowering the rear drawer area due to the automatic drawer pull-in is the alteration of the joint between two closely superposed drawer blinds. When pulling out the drawer its back end is raised, reducing by its tilting motion about the roller the blind joint to the blind below it. During the last part of the closing motion the rear area of the drawer is lowered, reducing the blind joint to the blind closely above it.

The above-described movement makes the uniform adjustment of all joints extremely difficult.

The resulting disadvantages described above are greater the shorter the drawer depths and, hence, the pull-out guides and the higher the drawer blinds used.

Another disadvantage results from the short run-in slope caused by its given roll-off angle and the lowering desired to be as small as possible. If the drawer is closed with a bang, it will jump back in many cases and will reclose automatically only if the rollers of the pull-out rails are still on the run-in slope of the guide rail. Due to the said short run-in slope this is not always assured. The drawers remain slightly open and sometimes roll into their totally open position by themselves. This effect happens in particular when the guide rails are fastened to the frame wall so as to be lower in front, to equalize the run-in drop somewhat.

SUMMARY OF THE INVENTION

It is an object of the invention to design a pull-out guide of the kind described at the outset so that the disadvantages discussed are eliminated at the least cost and additionally, an improved run-in behavior is achieved.

According to the invention this problem is solved as the upper pull-out rail legs serving as a rolling surface for the rollers have in their front end areas a run-in slope each running in the same direction and preferably parallel to the run-in slope in the end area of the guide rail on the frame side.

As to their dimensions, these run-in slopes may be designed so that the rollers of both the pull-out and guide rails roll over the bending edge in the run-in slope at the same time during the slide-in motion. The automatic run-in pull is thereby intensified considerably. The force to open the drawers must be correspondingly greater. For drawers of little net weight and small load capacity this improves the run-in and staying closed behavior considerably. The guide rails and, hence, the drawer is lowered by the same amount front and rear in a closed position so that the legs of both rail pairs are parallel and the blind is flush with the frame almost jointlessly.

In another embodiment the run-in slope of the pull-out rail is arranged so that the higher end of the run-in slope is placed a short distance from the front drawer end in the longitudinal direction of the pull-out rail. This measure makes for a stepless run-in, which brings the following advantages: the drawer is pulled in earlier, but with the same pulling force because the angle of the front run-in slope matches the angle of the rear run-in slope and is intensified at the moment the pull-out rail roller rolls over the bending edge in the rear slope. This causes the drawer to stay closed automatically in all those cases in which it jumped back or opened again due to being closed with a bang.

The automatic run-in is thus lengthened by one step, the distance over which both rollers jointly roll over both run-in slopes being relatively short, but sufficient to accelerate the drawer closing motion positively. A few millimeters before reaching the closed drawer position the front guide rail roller arrives under the pull-out rail leg part which is higher by the amount of the run-in slope gradient. Therefore, the pull-out rail is lowered both rear and front by approximately the same amount so that the drawer is guided approximately parallel to the frame rail. Until such time that the pull-out rail roller is in complete contact with the run-in stop, the higher horizontal leg part of the pull-out rail rolls at a stable level on the guide rail roller for the remaining millimeters. During this travel, the pull-out rail roller is lowered even further until complete parallellism of guide rail and pull-out rail is obtained. In closed position, therefore, the blind can be flush with the frame and the adjacent blinds almost without a gap.

The subject of the present invention follows not only from the subject of the various patent claims, but also from the combination of the various patent claims.

All data and features disclosed in the documents, in particular the physical design shown in the drawings, are claimed as essential to the invention to the extent they are, individually or in combination, new vis-a-vis the state of the art.

The invention is explained below in greater detail with reference to the drawings which illustrate but a single embodiment. Additional features and advantages of the invention are evident from the drawings and their description.

DETAILED DESCRIPTION OF THE INVENTION

Figure 1:
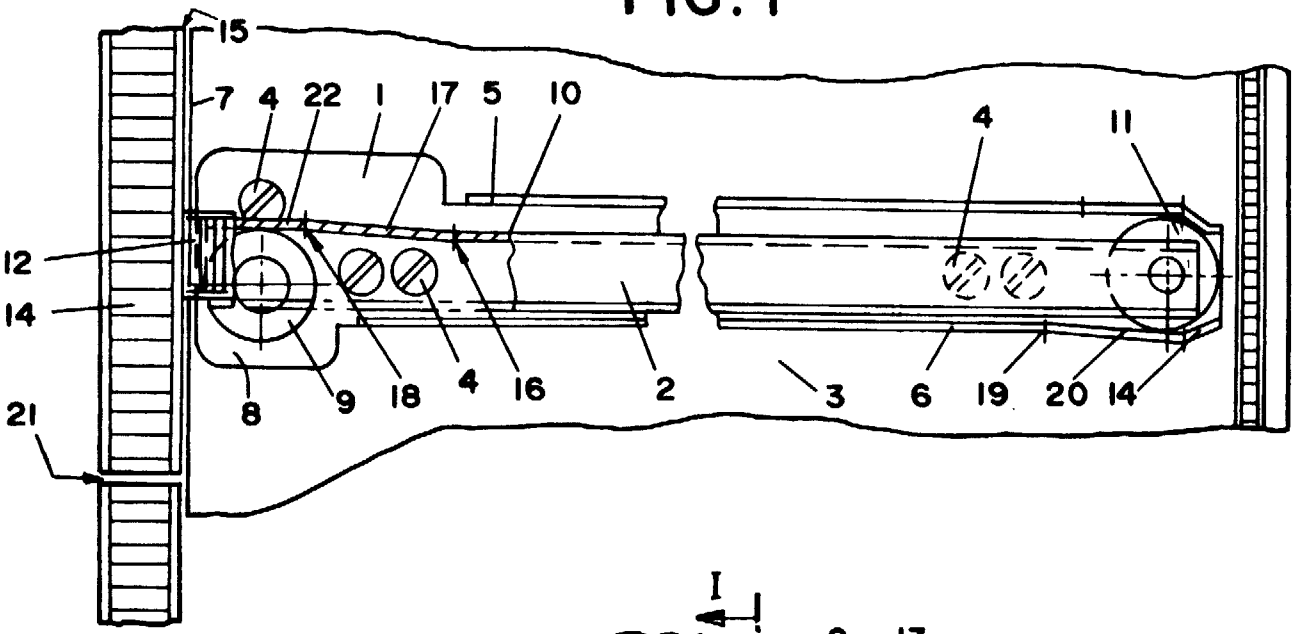
FIG. 1 is cross-sectional view of FIG. 2, illustrating a guide rail.
Figure 2:
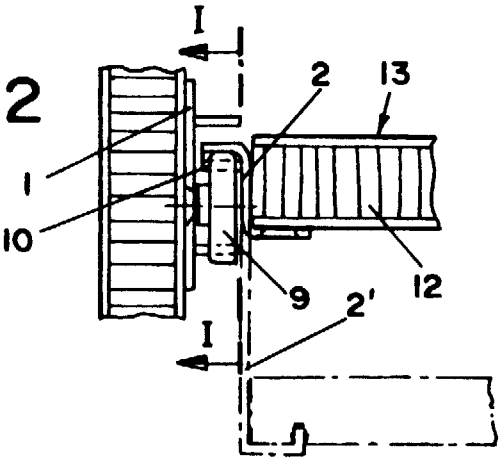
FIG. 2 is a top plan view of the drawer front and a pull-out guide pair.

As illustrated in FIG. 1 the guide rail 1 is fastened in horizontal alignment to a frame sidewall 3 by means of screws 4. The guide legs 5, 6 form exactly a 90° angle with a frame face 7. Rotatably mounted in a front area to the vertical leg of the guide rail 1 is a roller 9 on whose top a horizontal, smooth and/or profiled leg 10 of the pull-out rail 2 is movably guided in rolling contact. The pull-out rail 2, in turn, has fastened to its rear end area a roller 11 which is rotatably mounted and guided in rolling contact between the horizontal legs 5, 6 of the guide rail 1. Thus starting at a certain pull-out length, the upper leg 5 supports the load of the drawer 12 whereas below this pull-out length the drawer load 13 is transmitted to the lower leg 6 by the roller 11.

Governing for the innovation is the slide-in zone traversed by the rollers 11, 9 from about 40 millimeters before the closed position to the run-in stop 14 and designed for improved automatic pull-in function. In this zone, the drawer load 13 acts in front vertically from the horizontal leg 10 of the pull-out rail 2 upon the roller 9 and in the rear also vertically from the roller 11 upon the horizontal leg 6 of the guide rail 1.

Figure 3:
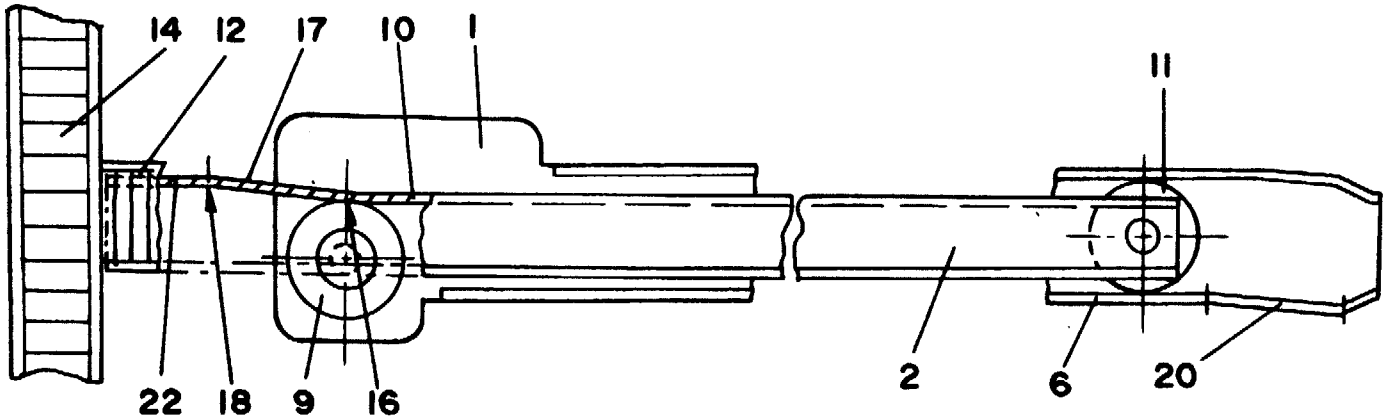
FIG. 3 illustrates the pull-out guide shown in FIG. 1 in a position behind the run-in slope.
Figure 4:
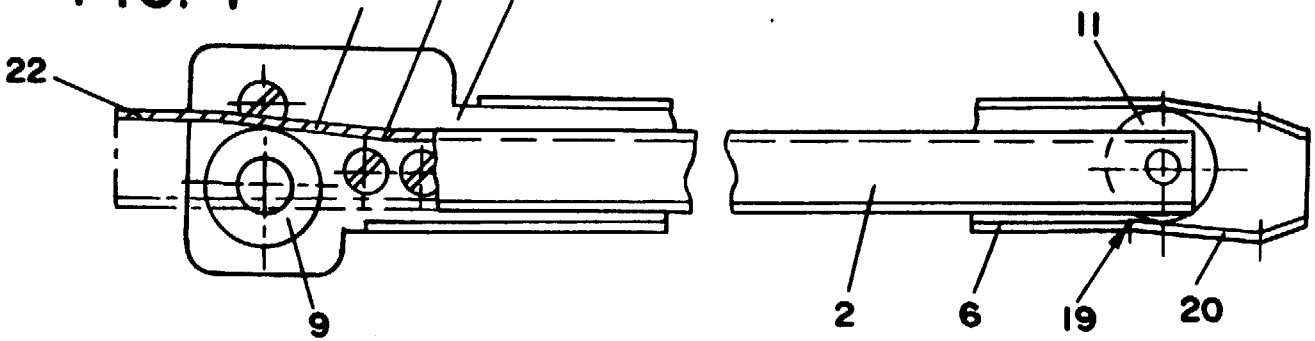
FIG. 4 shows the pull-out guide in a position in front of the run-in slope.

FIG. 3 shows the initial position of this run-in zone. The pull-out rail 2 or pull-out frame 2′ with its drawer 12 fastened to it rests in load-transmitting fashion on the roller 9.

This point of contact 16 is the one end of the front run-in slope 17, at which the horizontal and load-transmitting leg 10 of the pull-out rail 2 is bent so as to rise obliquely towards the front while the other end of the run-in slope 17 is formed by the second bending edge 18 at the transition of the leg 10 to the horizontal. When the first bending edge 16 of the pull-out rail 2 rolls over the roller 9 during its slide-in motion, it experiences, due to the run-in slope 17, a uniformly accelerating slide-in motion in the closing direction. During this initial phase the roller 11 of the pull-out rail 2 is still in rolling contact with the horizontal leg 6 of the guide rail 1. When the roller 11 subsequently rolls over the bending edge 19 of the rear run-in slope 20, the automatically acting pull-in force is intensified considerably. Therefore, the additional front run-in slope 17 results in by far a greater pull-in force without the need to increase the angle of the rear run-in slope 20. Increasing the angle would result in a greater drop of the rear roller 11. The former oblique position of the pull-out rail by only lowering the rear area is now equalized by the additional lowering in the area of the front pull-out guide. The pull-out rail 2 with the drawer 12 is now exactly horizontal with respect to the guide rail 1 in the closed position so that the blind 14 will be parallel with the body and the smallest possible joints 15, 21 are needed.

Angle and length of the run-in slopes 17, 20 are dimensionally the same but they are staggered relative to each other in their function. The front run-in slope 17 becomes active first, with the function of the rear run-in slope 20 trailing. This staggering results in a stepwise run-in, as adjacent to the front run-in slope a horizontal leg part 22 which, when the drawer is closed, rests in load-transmitting fashion on the roller 9, determines the height of the drawer.

I claim:

1. A pull-out guide [to be used in drawers and other similar objects] *for supporting a drawer in a furniture frame* comprising:

(a) a U-shaped guide rail [attached to a side wall of] *mountable in a furniture frame for supporting* the drawer;

(b) a Z-shaped pull-out rail [located within] *secured to the drawer and extending into* said U-shaped guide rail to move in a horizontal direction as the drawer is pulled out of and pushed into the furniture *frame;*

(c) a front roller rotatably mounted in a front area of said guide rail [allowing the drawer to move in the horizontal direction];

(d) *said guide rail having* an upper guide leg paired with a lower guide leg [fastened to the side wall of the drawer], said lower guide leg having a run-in slope in an *end* area of said lower guide leg abutted by a run-in stop [and this arrangement is used in moving said drawer];

(e) a rear roller rotatably fastened to a rear end area of said Z-shaped pull-out rail *for* moving in the horizontal direction and guided by a rolling contact along one surface of said lower guide leg and one surface of said upper guide leg;

(f) *said pull-out rail having* an upper leg [paired with a lower leg of said Z-shaped pull-out rail, said upper leg] serving as a rolling surface [of] *on* said front roller and having in a front end area a run-in slope parallel to said run-in slope of said [U-shaped] *lower* guide [rail] *leg*, and said run-in slope of said upper leg [is] *being* disposed a short distance from an end of said pull-out rail to enable said [front roller] *drawer* to slide into [said drawer] *the furniture frame* by [passing] a bending edge [on] *of the run-in slope of* said upper leg of said Z-shaped pull-out rail[,] *passing over the front roller* while said rear roller is located along a horizontal area of said lower leg of said guide rail *before the rear roller passes over a bending edge onto the run-in slope of the lower guide leg.*

2. A pull-out guide according to claim 1, wherein [said bending edge on] said upper leg of said Z-shaped pull-out rail [is used] *includes a bending edge at the upper end of the run-in slope thereof* to adjust [a] *the* height of the drawer.

* * * * *